United States Patent [19]

Bachli

[11] Patent Number: 5,227,206
[45] Date of Patent: Jul. 13, 1993

[54] PROCESS FOR COATING OF A SURFACE MADE OF GLASS

[76] Inventor: Emil Bachli, Marktgasse 7, CH-5304 Endingen, Switzerland

[21] Appl. No.: 656,144
[22] PCT Filed: Jul. 16, 1990
[86] PCT No.: PCT/CH90/00172
 § 371 Date: Mar. 18, 1991
 § 102(e) Date: Mar. 18, 1991
[87] PCT Pub. No.: WO91/01429
 PCT Pub. Date: Feb. 7, 1991

[30] Foreign Application Priority Data

Jul. 16, 1989 [CH] Switzerland ............ 02650/89
Jul. 24, 1989 [CH] Switzerland ............ 03076/89

[51] Int. Cl.$^5$ ................................. E06B 3/24
[52] U.S. Cl. ............................ 428/34; 428/192; 156/107; 156/109; 52/788; 427/165; 427/168; 427/266; 427/284
[58] Field of Search ............ 428/34, 192, 343, 432; 156/107, 109; 52/788; 427/266, 284, 166, 168, 165

[56] References Cited

U.S. PATENT DOCUMENTS 3,544,294 12/1970 Goto ........................... 428/34

Primary Examiner—Donald J. Loney
Attorney, Agent, or Firm—Edmund M. Jaskiewicz

[57] ABSTRACT

For coating the glass edge of two wall elements (2, 3) forming interspace (5) for heat insulating structural and/or light element (1), metallic adhesive layer (4) is produced with the use of a physical (PVD) or chemical (CVD) deposition of the coating material from a gas or vapor phase on one side of each wall element (2, 3). On this adhesive layer (4) barrier layer (6) protecting the latter is deposited and the barrier layer is provided with subsequent solder layer (7). These solder layers (7) are bonded with sheet (8) that edges structural and/or light element (1) on the edge in a gastight manner.

14 Claims, 1 Drawing Sheet

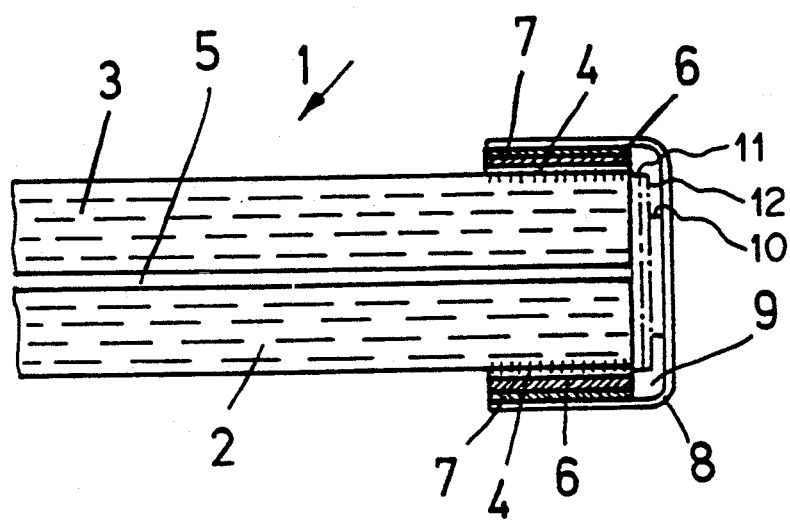

PROCESS FOR COATING OF A SURFACE MADE OF GLASS

The invention relates to a process for the coating of a surface made of glass or a glass alloy by physical (PVD) or chemical (CVD) deposition from a gas or vapor phase.

As is known, the coating methods initially mentioned, PVD—short for "physical vapor deposition"—and CVD—short for "chemical vapor deposition" comprise vapor deposition sputtering, ion plating, the reactive variants of these methods, thermal, plasma and photon activated as well as laser induced CVD. These coating methods are described in detail in the technical book "Oberflaechen- und Duennschicht-Technologie" [Surface and Thin-Layer Technology], 1987 edition by Rene A. Haefer.

In the PVD processes the deposition from the gas phase takes place by vapor deposition, sputtering or ion plating. In vapor deposition in a vacuum, the coating material vaporizes in a heatable source and the vapor atoms that propagate in a straight line can be deposited on the substrate as a layer.

Sputtering or cathode spraying is a vacuum process in which ions meet the coating material (target material) and atomize it by pulse transmission. In ion plating in a vacuum, a part of the atoms reaching the substrate are ionized and accelerated by an electrical field. Through the acceleration energy, with which the particles hit the substrate, the properties of the layer deposited are enhanced. In this way, thin layers for optical, opto-electronic, magnetic and microelectronic components are produced. Further fields of application are tribology, protection against corrosion, coating for heat insulation as well as decorative layers.

CVD processes are carried out with chemical deposition from the vapor phase. In the thermal CVD process, chemical reactions take place in the vapor phase, whereupon the reaction material is deposited as a layer on the substrate.

Further, there are plasma-activated CVD, photon-activated CVD as well as laser induced CVD. The CVD processes are used mainly in machine building and apparatus engineering as well as in the electronics industry and they serve for the production of layers for protection against wear or for protection against corrosion.

By these processes the material and condition properties of the substrate can be altered to a specific penetration depth. The properties of the edge layer then depend on the substrate material, the process chosen and the process parameters.

The production and use of insulated glass windows is concerned to a large extent with the insulation zone between the individual glass panes and their sealing in relation to the environment.

Windows of this kind, formed from two or more glass panes, are provided with shaped metal strips glued on the edges with an elastically acting paste. In another design the edge sealing of the so-called insulated glass windows is produced by a lead strip soldered with the glass panes, and the edge of the glass panes is previously provided with a copperplated or a tinplated adhesive layer by a flame-spraying process.

Experience shows that such sealings are not gastight, since on the one hand, the argon introduced as an insulating gas into the hollow space provided between the glass panes diffuses by the rubber sealing, or since, on the other hand, the adhesive layer between the glass pane and the copper layer is porous. This permeability permits the penetration of moisture between the glass panes, so that the window is fogged at times.

Gastight edge seals have remained an unsolved problem for years and thus an obstacle in the development of greatly improved heat insulations, particularly in the window industry.

Moreover insulation glazings with high insulation values permit the recovery of energy from natural light in an economical manner.

In particular, because of the unsolved sealing problem, it has not as yet been possible to design a light element or window which exhibits an extremely high insulation value as a result of an evacuated hollow space.

A permanently evacuated structural and/or light element would open up new possibilities for home and industrial construction, particularly in the area of thermal energy significant savings could be achieved, if for example, by evacuated transparent walls the heating of homes could be achieved by the incident light, and thus a reduction of considerable amounts of fossil fuels that are harmful to the environment could be realized.

Consequently, because of an unsatisfactory situation, the object is to create a process according to the initially mentioned type, with which heat losses in closed spaces are largely eliminated or the heating of closed spaces can take place principally by daylight.

According to the invention this object is attained in that to form a gastight structural and/or light element consisting of at least two separated wall elements, the edge is connected on the periphery of at least one lateral surface of each wall element with a metallic adhesive layer.

This procedure guarantees the production of structural and/or light elements consisting of at least two separated wall elements that form an insulating interspace with a gastight edge sealing.

By the use of this process loosened atoms of the coating material strike the solid surface of the wall elements (substrate) and are loosely bonded as adatoms. As adatoms they diffuse over the surface until they condense as a stable nucleus or by attachment to existing nuclei. The mobility of the adatoms on the surface depends on their kinetic energy, the temperature of the substrate and the strength of the interaction between adatom and substrate. If there exists a strong interaction, a high nucleus density is obtained, and vice versa. By attachment of adatoms the nuclei grow into so-called islands, and the latter coalesce into a coherent film. The nucleus density and the nucleus growth determine the contact surfaces in the transition zone. When there is great nucleus density the adhesive force is correspondingly great because of large contact surfaces. The layer material is anchored in pores of the substrate surface or the surface of the wall elements.

The layer connected with the substrate in these processes attains a tensile strength that is greater than that exhibited by the glass material of the wall elements. In addition the transition zone, also called interface zone, is just as gastight as the wall element itself that is made of glass.

The atoms dusted with this procedure are ejected with high energy which reaches 10 to 40 electron volts (eV) depending on the target or coating material, while vaporized atoms exhibit energies of only 0.2 to 0.3 eV in the vaporization process. The higher energies in sputtering is a reason for better adhesiveness of the layer applied in contrast to the vaporization process.

The adhesiveness of a sputtered surface on glass depends on the traps on which centers of nuclear bonding arise in the first moment of the layer formation. These centers are formed by faults in the surface; from faults in the crystal lattice, local changes in potential as a result of free bonds or electrical charges.

The cathode atomization or sputtering favor the formation of such traps.

Of the processes mentioned, the magnetron sputtering system from the PVD (physical vapor deposition) group should prove to be the best suitable process for the achievement of a gastight bonding between the insulation glass and the edge, which thus far had not been achieved. This sputtering system allows for relatively high rates of deposition and large deposition surfaces with low substrate heating.

Before sputtering is begun, ion erosion is advantageously produced on the glass surface, for example on the width of the adhesive layer to be produced by shifting the target potential on the glass surface. Thus the glass surface is cleaned and additional faults which act as coupling agents are created in the crystal lattice.

This effect can be strengthened by placing an electrode supplied with high frequency over the glass surface, so that the glass comes under electron bombardment.

The first atom layers of the reactive metallic adhesive layer oxidize and alloy with the glass.

To prevent damage to the metallic adhesive layer during the production of the airtight bond between the wall elements, advantageously a protective barrier layer can be provided, which is suitable as a material that can be soldered or welded. This barrier layer consists of nickel, copper or similar metals or metal alloys that can be easily soldered and that exhibit a similar expansion coefficient as glass.

By the barrier layer during the melting process the soft solder deposited on the barrier layer is prevented from alloying with the adhesive layer and from destroying the latter. The soft solder advantageously has an expansion coefficient like glass.

The melting temperature of the soft solder should not be higher than the temperature tolerance of a heat shield layer of the window glass.

As an alternative, with the exception of the adhesive layer, the building up of the metallic layer can be carried out by electrodeposition or chemical deposition or by thermal spraying, and with the electrodeposition method it is advantageous, if for better electrical conductivity the adhesive layer is first provided with a copper deposit.

A structural and/or light element proves to be particularly simple, if two separated wall elements are edged in a gastight manner on their respective coated edge with a striplike sheet soldered with a soft solder.

Such edging is suitable for the formation of a hollow space between the front edge of the wall elements and the gastight sheet surrounding them.

This hollow space can be equipped with getter means that favor the maintenance of the vacuum between the wall elements.

For the protection of the wall elements from excessive heating to about 350° C. when the getter means is activated it is advantageous for the front edge of the wall elements to be coated with an air permeable insulation layer.

So that air can flow against the getter means, it is preferable to provide a permeable layer or a wire mesh between the insulation and the getter means.

BRIEF DESCRIPTION OF THE DRAWING

The structural and/or light element provided for carrying out the process according to the invention is represented in the single FIGURE in an embodiment given as an example and then explained.

With 1 a structural and/or light element of a building is illustrated in a cutout. The one edge of this structural and/or light element 1 consisting of two wall elements 2, 3 discloses an adhesive layer 4 of a metallic material produced by physical (PVD) or chemical (CVD) deposition from the gas or vapor phase, a layer which is provided for a gastight connection between wall elements 2, 3 consisting of glass and forming, by a distance, interspace 5 that can be evacuated. This adhesive layer 4 could also be deposited on the edges turned toward each other between wall elements 2, 3 for the formation of a seal.

In the present representation on adhesive layer 4, barrier layer 6 protecting the adhesive layer is deposited, a barrier layer which is distinguished as solderable and is produced by electro or chemical process or by thermal spraying. Another layer 7 made of solderable material is fused with barrier layer 6 and serves for the airtight bonding of solderable sheet 8 that edges the edge of structural and/or light element 1 formed by two wall elements 2, 3.

As shown, this sheet 8 can be placed so that it forms a hollow space 9 between the front edge of structural and/or light element 1 with it; this hollow space can be provided for the deposit of getter means 10.

To avoid damage when getter means 10 is activated and to its effectiveness, air permeable insulation 11 lies against the front edge of wall elements 2, 3 as a heat shield, and in front of the insulation is permeable layer 12 in the form of wire mesh, fiber or similar materials suitable for this purpose.

I claim:

1. Process for forming a structure and/or lighting element having at least two spaced glass or glass alloy wall elements with gas tight seals at their edges to define a gas tight space therebetween, the steps of subjecting an outer lateral surface of each wall element at the peripheral edge thereof to a physical (PVD) or chemical (CVD) deposition from the gas or vapor phase to form a metallic adhesive layer thereon, covering the metallic adhesive layer with a solderable metal layer to define a barrier layer, and connecting the barrier layers on the metal adhesive layers on the wall elements with a solderable metal strip around the peripheral edges of the wall elements to form a gas tight seal of the space therebetween.

2. Process according to claim 1, wherein the barrier layer is formed by one of electrodeposition or chemical deposition or by thermal spraying.

3. Process according to claim 2, wherein the adhesive layer is provided with a copper layer before the electrocoating of the barrier layer.

4. Process according to claim 1, wherein the adhesive layer is made by magnetron sputtering.

5. Process according to claim 1, wherein before making of the adhesive layer, an electrode, supplied with high frequency, is placed above the glass surface.

6. A structural and/or light element comprising at least two spaced glass or glass alloy wall elements to define an interspace therebetween and each having opposed lateral surfaces and a peripheral edge, means at said peripheral edge for forming a gas tight seal of said interspace, said means comprising a metallic adhesive layer on an outer lateral surface of each said wall element at the peripheral edge thereof, a barrier layer of a solderable metal coated upon each said metallic adhesive layer, and a solderable metal strip around the peripheral edges of said wall elements and connected to said barrier layers.

7. Structural and/or light element according to claim 6 wherein barrier layer (6) is coated with a soft solder (7), which has a lower melting temperature than the temperature tolerance of heat protective layer of wall element (2, 3).

8. Structural and/or light element according to claim 6 wherein said two separated wall elements (2, 3) are bordered gastight on their respective coated edge by a soldered striplike sheet (8).

9. Structural and/or light element according to claim 8, wherein a hollow space (9) is provided between the front edge of wall elements (2, 3) and sheet (8).

10. Structural and/or light element according to claim 9 wherein said hollow space (9) comprises getter means (10).

11. Structural and/or light element according to claim 10 wherein the outer peripheral edge of wall elements (2, 3) has an air permeable insulation (11).

12. Structural and/or light element according to claim 11 comprising a permeable layer (12) between insulation (11) and a getter means (10).

13. Structural and/or light element according to claim 6 wherein the material of barrier layer (6) has an expansion coefficient at least approximately similar to glass.

14. A structural and/or light element having at least two spaced glass or glass alloy wall elements to define an interspace therebetween and formed by the process of subjecting at least one lateral surface of each wall element at the peripheral edge thereof to a physical (PVD) or chemical (CVD) deposition from the gas or vapor phase to form a metallic adhesive layer thereon, and connecting the metal adhesive layers on the wall elements to form a gastight seal of the space therebetween.

* * * * *